United States Patent
Fukuhara

(10) Patent No.: US 11,728,536 B2
(45) Date of Patent: Aug. 15, 2023

(54) STORAGE BATTERY CONTAINER

(71) Applicant: NGK INSULATORS, LTD., Nagoya (JP)

(72) Inventor: Motohiro Fukuhara, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 95 days.

(21) Appl. No.: 17/128,425

(22) Filed: Dec. 21, 2020

(65) Prior Publication Data

US 2021/0111449 A1 Apr. 15, 2021

Related U.S. Application Data

(63) Continuation of application No. PCT/JP2020/009159, filed on Mar. 4, 2020.

(30) Foreign Application Priority Data

Mar. 14, 2019 (JP) ................. 2019-047237

(51) Int. Cl.
*H01M 10/6563* (2014.01)
*H01M 10/627* (2014.01)
(Continued)

(52) U.S. Cl.
CPC ..... *H01M 10/6563* (2015.04); *H01M 10/627* (2015.04); *H01M 10/6551* (2015.04);
(Continued)

(58) Field of Classification Search
CPC .......... H01M 10/3909; H01M 10/617; H01M 10/627; H01M 10/63; H01M 10/653;
(Continued)

(56) References Cited

U.S. PATENT DOCUMENTS

2008/0220319 A1 9/2008 Takagi et al.
2011/0274995 A1* 11/2011 Tanabe ................. C01B 3/48
429/423

(Continued)

FOREIGN PATENT DOCUMENTS

JP 2008-226488 A1 9/2008
WO 2013/111426 A1 8/2013
(Continued)

OTHER PUBLICATIONS

English translation of International Preliminary Report on Patentability (Chapter 1) (Application No. PCT/JP2020/009159) dated Sep. 23, 2021, 9 pages.

(Continued)

*Primary Examiner* — Lingwen R Zeng
(74) *Attorney, Agent, or Firm* — Burr Patent Law, PLLC

(57) ABSTRACT

A storage battery container is provided with an air supply part having an air supply port provided to the bottom surface, a variable heat dissipation device that balances accumulated heat inside the storage battery, and an air discharge part of a rear surface having an air discharge port correspondingly provided to a heat release part of the variable heat dissipation device. The air supply part puts the air supply port in an open state when power is being supplied, and puts the air supply port in a closed state when the power supply stops. The air discharge part puts the air discharge port in an open state when the variable heat dissipation device is actuated, and puts the air discharge port in a closed state when the actuation of the variable heat dissipation device stops.

7 Claims, 9 Drawing Sheets

(51) Int. Cl.
*H01M 10/6551* (2014.01)
*H01M 50/209* (2021.01)
*H01M 50/204* (2021.01)
*H01M 10/658* (2014.01)
*H01M 10/39* (2006.01)
*H01M 10/617* (2014.01)
*H01M 50/253* (2021.01)
*H01M 10/6556* (2014.01)
*H01M 10/653* (2014.01)
*H01M 10/63* (2014.01)
*H01M 10/6571* (2014.01)

(52) U.S. Cl.
CPC ...... *H01M 50/209* (2021.01); *H01M 10/3909* (2013.01); *H01M 10/617* (2015.04); *H01M 10/63* (2015.04); *H01M 10/653* (2015.04); *H01M 10/658* (2015.04); *H01M 10/6556* (2015.04); *H01M 10/6571* (2015.04); *H01M 50/204* (2021.01); *H01M 50/253* (2021.01); *Y02E 60/10* (2013.01)

(58) Field of Classification Search
CPC ......... H01M 10/6551; H01M 10/6556; H01M 10/6563; H01M 10/6571; H01M 10/658; H01M 50/204; H01M 50/253; H01M 50/209; Y02E 60/10
See application file for complete search history.

(56) References Cited

U.S. PATENT DOCUMENTS

| | | | |
|---|---|---|---|
| 2011/0300421 A1* | 12/2011 | Iritani | H01M 10/615 429/120 |
| 2014/0308545 A1 | 10/2014 | Tamakoshi et al. | |
| 2016/0166971 A1 | 6/2016 | Fukuhara et al. | |
| 2016/0226115 A1* | 8/2016 | Wakida | H01M 10/6563 |
| 2017/0187083 A1* | 6/2017 | Mueller | H01M 10/613 |

FOREIGN PATENT DOCUMENTS

| | | |
|---|---|---|
| WO | 2015/029830 A1 | 3/2015 |
| WO | 2015/056739 A1 | 4/2015 |

OTHER PUBLICATIONS

International Search Report and Written Opinion (Application No. PCT/JP2020/009159) dated Apr. 14, 2020.
Extended European Search Report (Application No. 20771076.5) dated Feb. 16, 2022.

* cited by examiner

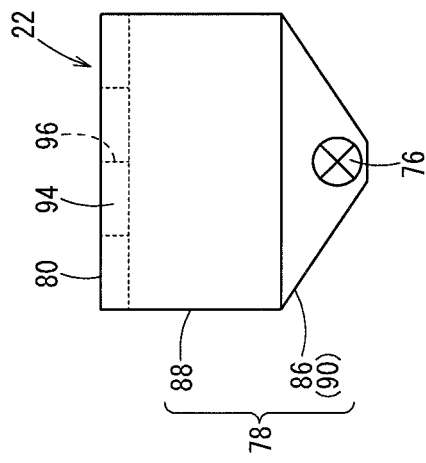
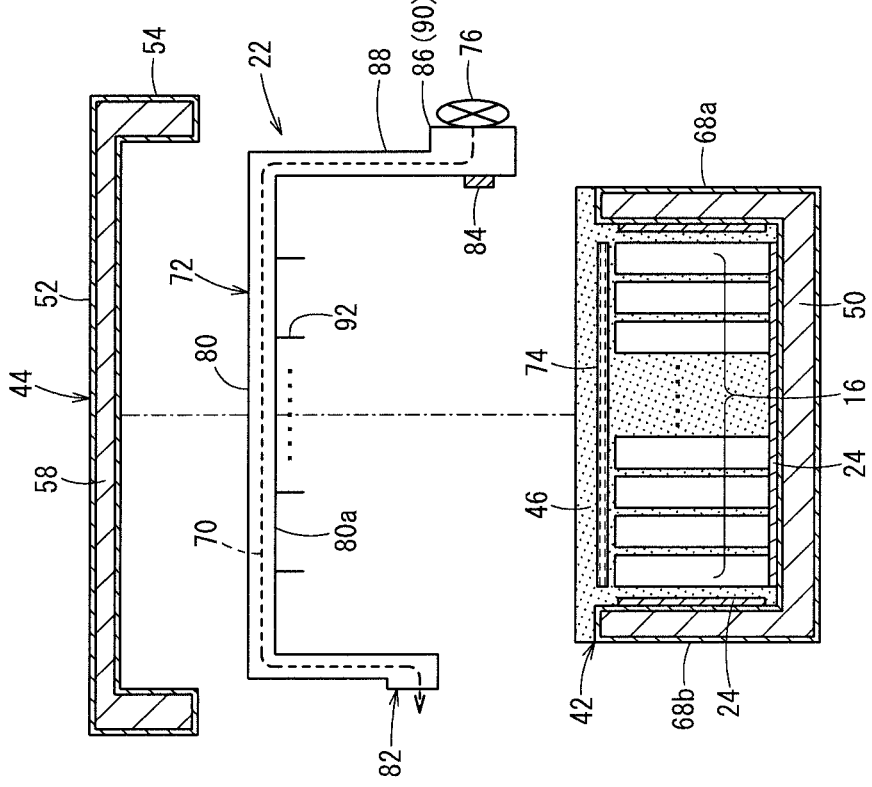

STORAGE BATTERY CONTAINER

CROSS-REFERENCE TO RELATED APPLICATIONS

This application is a Continuation of International Application No. PCT/JP2020/009159 filed on Mar. 4, 2020, which is based upon and claims the benefit of priority from Japanese Patent Application No. 2019-047237 filed on Mar. 14, 2019, the contents all of which are incorporated herein by reference.

TECHNICAL FIELD

The present invention relates to storage battery containers, and to a storage battery container that is suitably applied to storage batteries that are, for example, operated at high temperatures.

BACKGROUND ART

In general, frequency regulation of electric power systems and adjustment of power demand and power supply of electric power systems are achieved by using a plurality of power generators, storage batteries, and the like within the systems. Further, adjustment of difference between generated power and planned output power from natural energy power generators, and reduction of fluctuations in power generation from natural energy power generators, too, are often achieved by a plurality of power generators, storage batteries, and the like. Storage batteries are capable of changing output power at higher speeds as compared to common power generators, and are therefore effective to regulate frequencies of electric power systems, adjust the difference between generated power and planned output power from natural energy power generators, and to adjust power demand and power supply of electric power systems.

High-temperature operated storage batteries, e.g., sodium-sulfur batteries (hereinafter referred to as NaS batteries), are effective as storage batteries for such purposes. The NaS batteries are secondary batteries that have a configuration in which metallic sodium and sulfur as active materials are separated and encased in a solid electrolyte cylinder. Accordingly, when heated to high temperatures, NaS batteries generate certain energy through electrochemical reactions of the two active materials being melted. In general, NaS batteries are used in the form of storage batteries in which a plurality of unit cells are assembled in an erected position and connected to each other (International Publication No. WO 2013/111426).

In the use of NaS batteries, a plurality of thermally insulated containers are stacked (arranged in tiers) in a vertical direction to form one module row, and a plurality of module rows are arranged side by side and encased in a single package, and further a control device is provided to control the module batteries in the package (for example, Japanese Laid-Open Patent Publication No. 2008-226488 and International Publication No. WO 2015/029830).

However, as described in International Publication No. WO 2013/111426, excessively raised temperatures in the casings of the storage batteries are not desirable for high-temperature operated storage batteries such as NaS batteries etc. Then, using the heat-dissipation variable air-cooling device described in International Publication No. WO 2015/056739 is proposed. This air-cooling device includes a duct provided in a casing, and a fan that is driven to cause a flow of coolant through the duct, to thereby prevent excessive temperature rise in the casing.

SUMMARY OF INVENTION

By the way, if a plurality of storage batteries are accommodated in a package as shown in Japanese Laid-Open Patent Publication No. 2008-226488, the air taken into the package by the operation of fans flows through the storage batteries and is discharged through an exhaust port formed in the ceiling.

In this case, the heat from the air-cooling device of each storage battery, for example, is discharged into the interior of the package, which will raise the temperature in the package and, in particular, produce temperature differences among well-ventilated portions and ill-ventilated portions. This leads to reduction in the operating efficiency of the storage batteries.

Further, the technique of International Publication No. WO 2015/029830 describes, as shown with the container device including two packages, a scheme to prevent the gas within the container device from being discharged to the outside by closing the air inlet and exhaust ports of the container device, but this technique necessitates separate units, for example to electrically open and close the air inlet and exhaust ports. This may lead to a complicated structure.

The present invention has been devised in order to solve the problems above, and an object of the invention is to provide a storage battery container that can reduce discharge of heat from the storage batteries into the interior of the container (including a package, container device, etc.), and can improve the operating efficiency of the storage batteries, while enabling a simplified structure.

According to an aspect of the present invention, a storage battery container has at least a top surface, a bottom surface, and a side surface and accommodates a plurality of storage batteries. The storage battery container incudes: an air supply portion including an air inlet port provided in the bottom surface; a variable heat dissipation device provided for each of the storage batteries and configured to, when being driven, introduce air from the air supply portion into the storage battery and discharge heat in the storage battery together with the air so as to achieve heat balance of heat accumulation in the storage battery; and an air exhaust portion provided on the side surface in correspondence with a heat discharge portion of the variable heat dissipation device and including an air exhaust port. The air supply portion places the air inlet port in an opened state when supplied with electric power, and places the air inlet port in a closed state when the supply of electric power is stopped, and the air exhaust portion places the air exhaust port in an opened state when the variable heat dissipation device is driven, and places the air exhaust port in a closed state when the variable heat dissipation device is stopped.

According to the storage battery container of the invention, it is possible to reduce discharge of heat from the storage batteries into the interior of the container (including a package, container device, etc.), and to improve the operating efficiency of the storage batteries, while enabling a simplified structure.

BRIEF DESCRIPTION OF DRAWINGS

FIG. 3A is a longitudinal section illustrating the configuration of the storage battery in an exploded form, and FIG. 3B is a front view illustrating an example configuration of an air introduction portion;

DESCRIPTION OF EMBODIMENTS

An embodiment in which the storage battery container of the invention is applied to NaS batteries will be described referring to FIGS. 1 to 9.

First, before describing the storage battery container of this embodiment (hereinafter referred to as container 10), a storage battery 12 that is accommodated in the container 10 (see FIG. 5) will be described referring to FIGS. 1 to 4.

Figure 1:
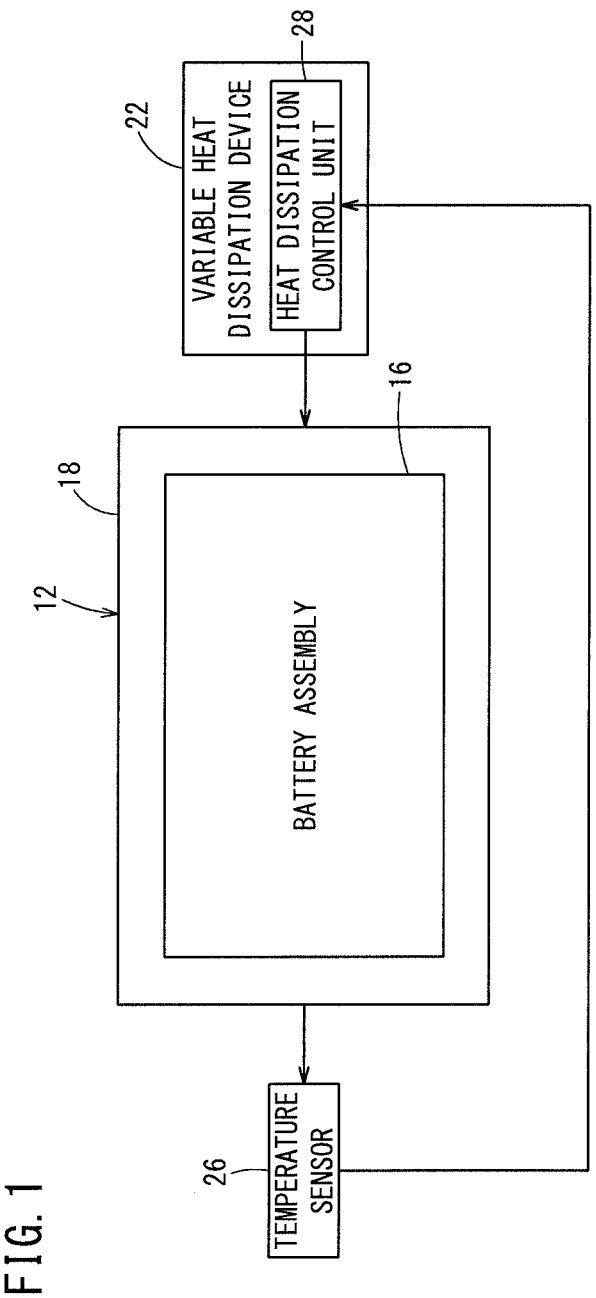
FIG. 1 is a block diagram illustrating a configuration of a storage battery that is accommodated in a storage battery container according to an embodiment.

As shown in FIG. 1, the storage battery 12 includes a casing 18 accommodating a battery assembly 16 formed of a plurality of unit cells 14 (see FIG. 4), and a variable heat dissipation device 22 for maintaining the temperature in the casing 18 within a certain allowable range (operating temperature range) so as to achieve heat balance of heat accumulation within the casing 18. A temperature sensor 26 for measuring the present temperature in the casing 18 is further provided. The variable heat dissipation device 22 includes a heat dissipation control unit 28 that drives a fan for feeding air into the casing 18. This will be described later.

Now, a specific example of the storage battery 12 provided with the variable heat dissipation device 22 will be described referring to FIGS. 2 to 4.

Figure 2:
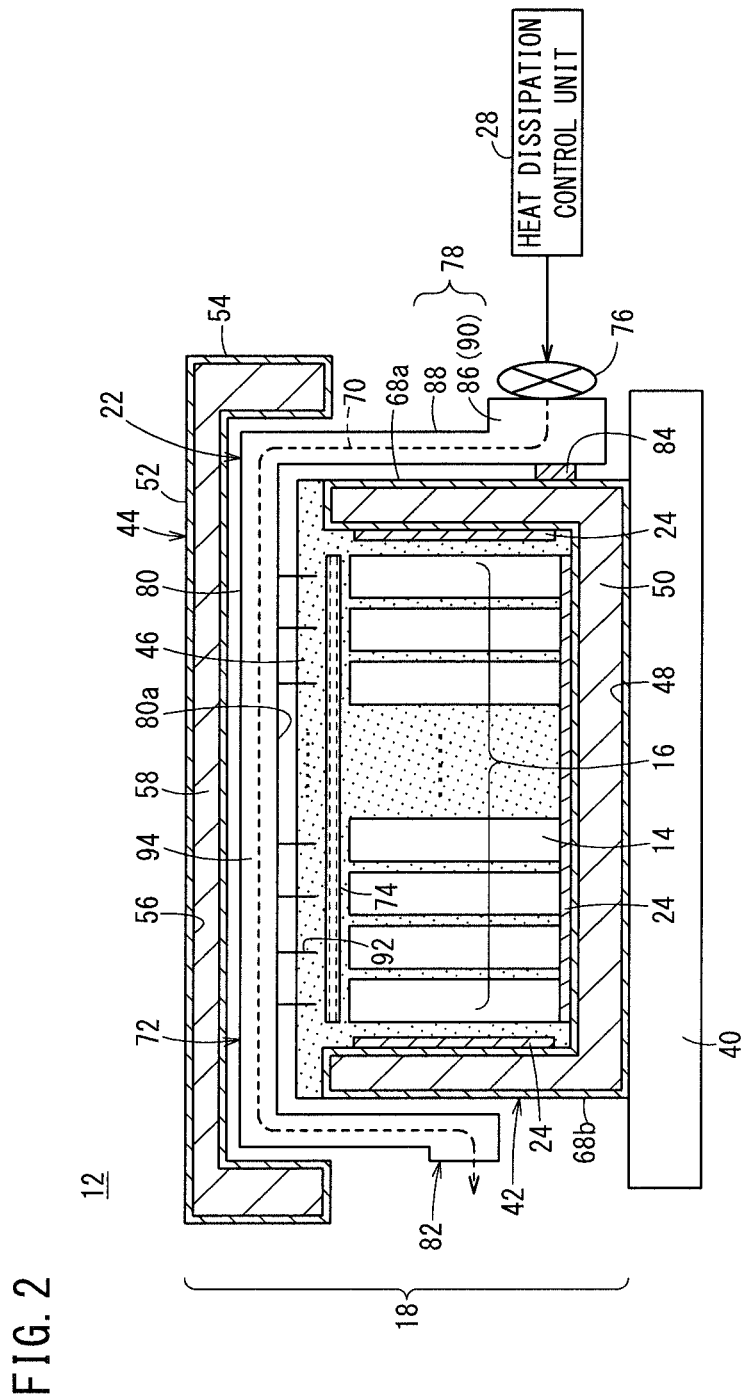
FIG. 2 is a longitudinal section illustrating, in a partially omitted manner, the configuration of the storage battery.

As shown in FIG. 2, the storage battery 12 includes a base 40 made of, e.g., a steel material, a box 42 placed and fixed on the base 40, the battery assembly 16 formed of a large number of unit cells 14 accommodated in the box 42, and a lid 44 closing the opening of the box 42. Each unit cell 14 is made in a cylindrical shape and accommodated within the box 42 in such a manner that its axial direction extends in a vertical direction. The box 42 and the lid 44 form the casing 18 of the storage battery 12.

Further, heaters 24, which are used to raise the temperature in the box 42, are provided on the bottom surface and inner wall surfaces of the box 42. Further, the space between the box 42 and the battery assembly 16 is filled with silica sand 46 for the purpose of transmitting heat from the heaters 24 to the unit cells 14 and absorbing heat generated from the unit cells 14.

Figure 4:
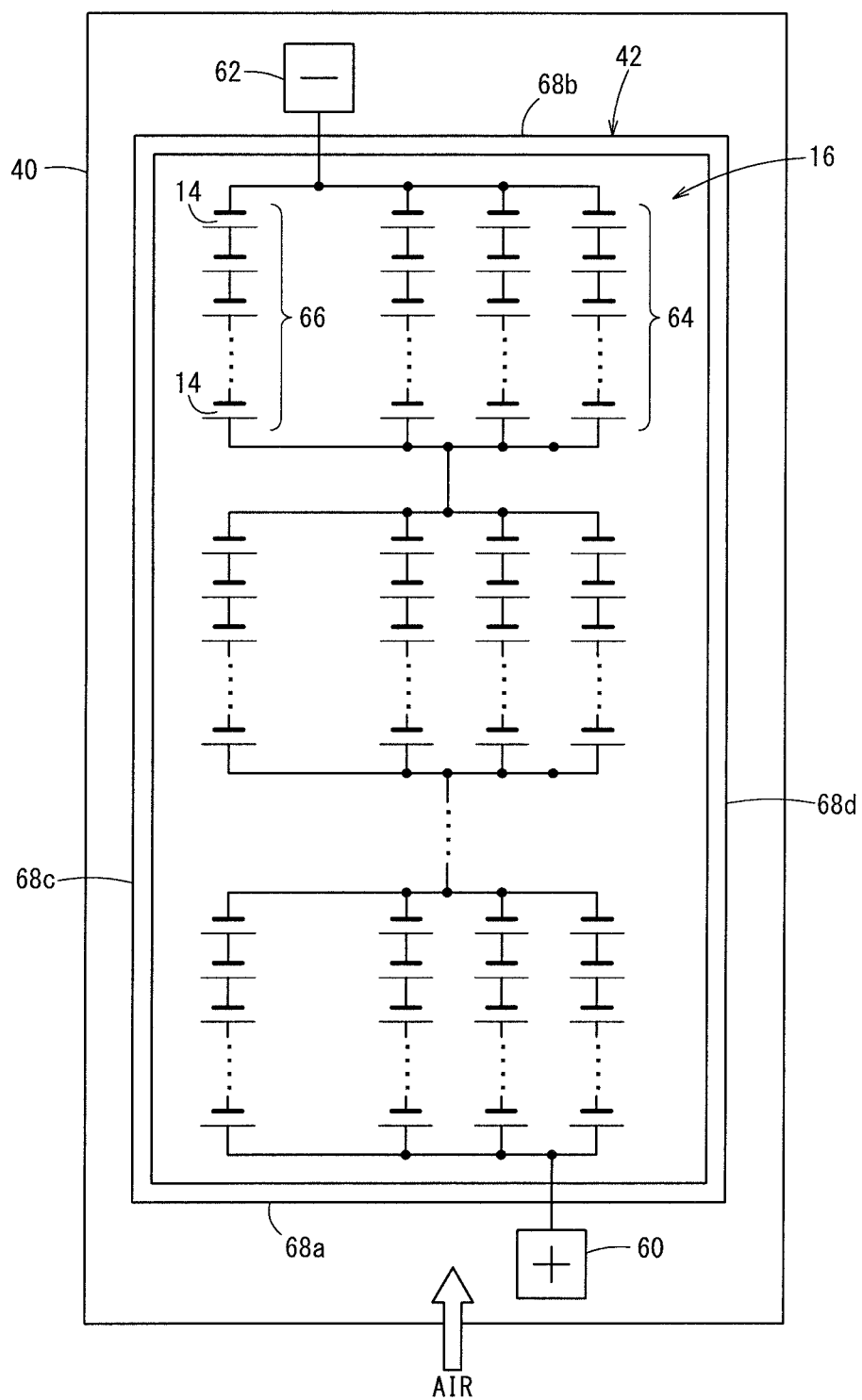
FIG. 4 is a circuit diagram illustrating, in a partially omitted manner, a battery assembly accommodated in a box.

The box 42 has a substantially cuboid shape, for example, includes four side walls (a first side wall 68a, a second side wall 68b, a third side wall 68c, and a fourth side wall 68d: see FIG. 4) and a bottom wall, and has an opening at the top. The box 42 is formed of a plate material made of stainless steel, for example, and is shaped like a box having a hollow 48 in itself. The hollow 48 is an enclosed space that is airtightly sealed, and has a structure in which the hollow 48 and the outside space can communicate with each other through a vacuum valve not shown. The hollow 48 is filled with a porous, vacuum insulation board 50 that is made by solidifying glass fiber into a plate-like shape with adhesive, and so the box 42 has a vacuum heat insulation structure.

The lid 44 has a top wall 52 and an awning 54, and is placed so as to close the opening at the top of the box 42. Like the box 42 described above, the lid 44 is also formed of a plate material made of stainless steel, for example, and is shaped like a box having a hollow 56 in itself. The hollow 56 is an enclosed space that is airtightly sealed, and has a structure in which the hollow 56 and the outside space can communicate with each other through a vacuum valve not shown. The hollow 56 is filled with a porous, vacuum insulation board 58 that is made by solidifying glass fiber into a plate-like shape with adhesive, and so the lid 44 has a vacuum heat insulation structure.

On the other hand, as shown in FIG. 4, the battery assembly 16 is formed of two or more blocks 64 that are connected in series from a positive outside terminal 60 to a negative outside terminal 62. Each block 64 includes two or more circuits (strings 66) connected in parallel, where each of the circuits is formed of two or more unit cells 14 connected in series. The positive outside terminal 60 protrudes outside through the first side wall 68a of the box 42, and the negative outside terminal 62 protrudes outside through the second side wall 68b of the box 42 (the side wall opposite to the first side wall 68a).

Then, as shown in FIGS. 2 to 3B, the variable heat dissipation device 22 includes a metal duct 72 which is provided at least between the box 42 and the lid 44 and through which air 70 flows, a plate member 74 provided between the battery assembly 16 and the duct 72 and having at least an electric insulating property, and a fan 76 provided outside of the box 42 and feeding the air 70 into the duct 72.

The duct 72 has an air introduction portion 78 made of metal into which the air 70 is introduced, a heat transport portion 80 made of metal and provided downstream of the air introduction portion 78 between the lid 44 and the box 42 so as to transport at least the heat generated in the box 42 together with the air 70, and a heat discharge portion 82 made of metal and provided downstream of the heat transport portion 80 so as to discharge the heat outward together with the air 70.

The air introduction portion 78 extends along the first side wall 68a of the box 42 into the space between the awning 54 of the lid 44 and the first side wall 68a of the box 42. In particular, a cushioning member 84 (heat insulator) is interposed between the air introduction portion 78 and the first side wall 68a of the box 42, so that the air introduction portion 78 is spaced apart from the first side wall 68a of the box 42. Preferably, the cushioning member 84 has a heat insulating function, and a heat insulator is used in this embodiment.

The air introduction portion 78 includes an air feed portion 86 into which the air 70 is fed from the fan 76 provided outside, and an air guide portion 88 communicating with the air feed portion 86, and guiding the air 70 fed into the air feed portion 86 to the heat transport portion 80. The air feed portion 86 has an air chamber 90. A duct in the air chamber 90 has a shape that gradually expands toward the air guide portion 88.

On the other hand, as shown in FIG. 3A, the heat transport portion 80 is provided between the top wall 52 of the lid 44 and the box 42. A lower surface 80a of the heat transport portion 80 is formed in a rectangular shape that is the same as the shape of the opening of the box 42, and the size of the lower surface 80a is substantially the same as the size of the opening of the box 42. Further, the lower surface 80a of the heat transport portion 80 (the surface facing the battery assembly 16 (or the plate member 74)) is provided with a plurality of fins 92 extending toward the battery assembly 16 (or toward the plate member 74)).

As shown in FIG. 3B, a duct 94 in the heat transport portion 80 has formed therein a plurality of supports 96 for maintaining the shape of the duct 94. The supports 96 can be of plate-like shape, corrugated shape, or piece-like shape.

As shown in FIGS. 2 and 3A, the heat discharge portion 82 is provided to extend along the second side wall 68b of the box 42 from the space between the second side wall 68b of the box 42 and the awning 54 of the lid 44, and is particularly in contact with the second side wall 68b of the box 42.

Then, the heat dissipation control unit 28 of the variable heat dissipation device 22 drives the fan 76, whereby the cooled air 70 is supplied into the duct 72 as the fan 76 operates. As the air 70 is supplied into the duct 72, the heat in the box 42 is transferred to the air 70 in the heat transport portion 80 and raises the temperature of the air 70. The temperature-raised air 70 is discharged to the outside of the box 42 through the heat discharge portion 82. That is, the heat in the interior of the casing 18 is dissipated. This forcibly cools the interior of the casing 18, and the interior of the casing 18 is efficiently cooled even if the box 42 and the lid 44 both have a highly heat-insulated structure. As a result, the temperature in the casing 18 can be maintained within an allowable range even if the discharge output is high or lasts for a long time, which enables the battery assembly 16 inside the box 42 to operate in an optimum operating environment.

Next, the container 10 of the embodiment will be described referring to FIGS. 5 to 9.

Figure 5:
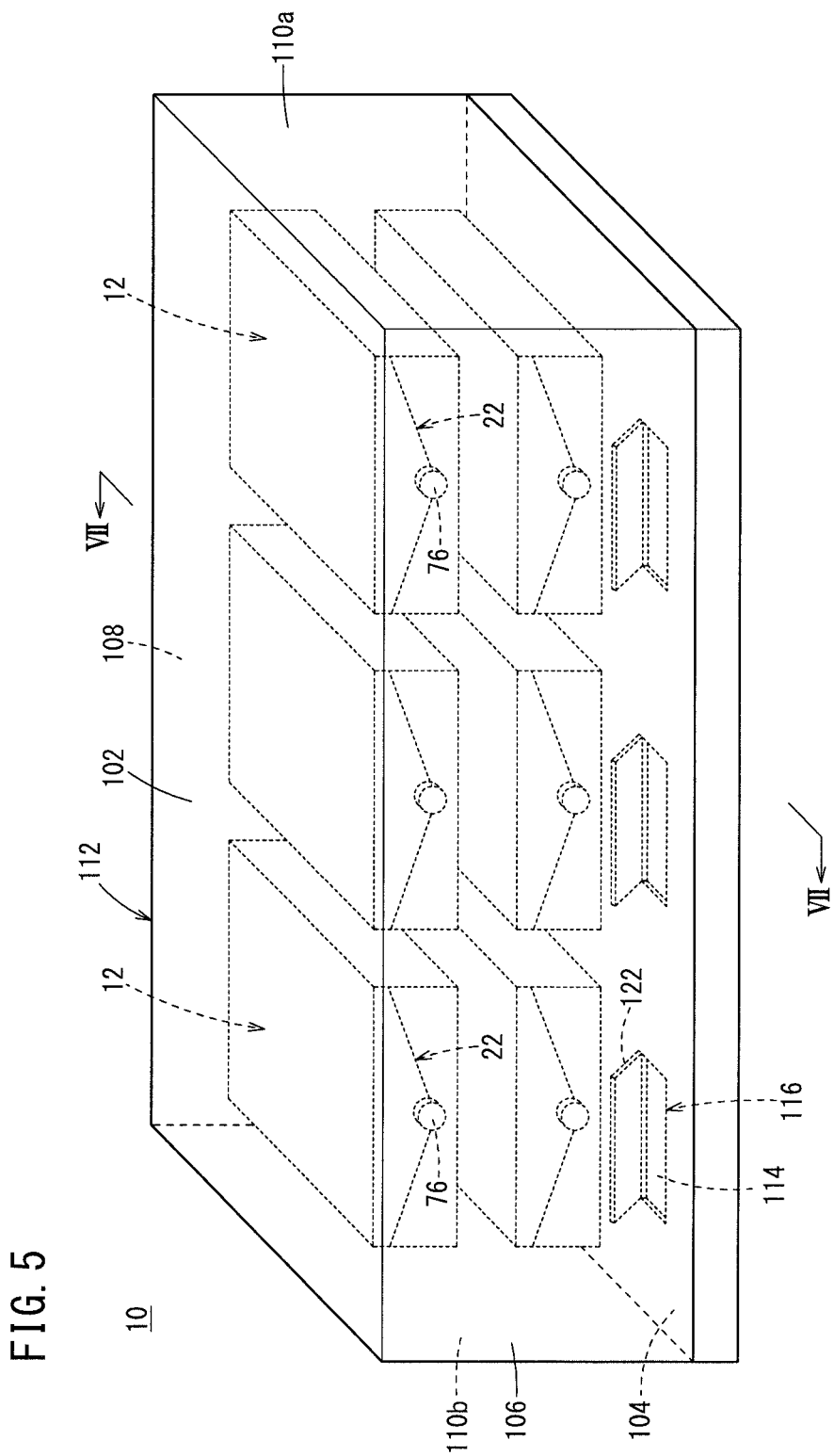
FIG. 5 is a transparent perspective view illustrating, in a partially omitted manner, the storage battery container of the embodiment as viewed from the front.
Figure 6:
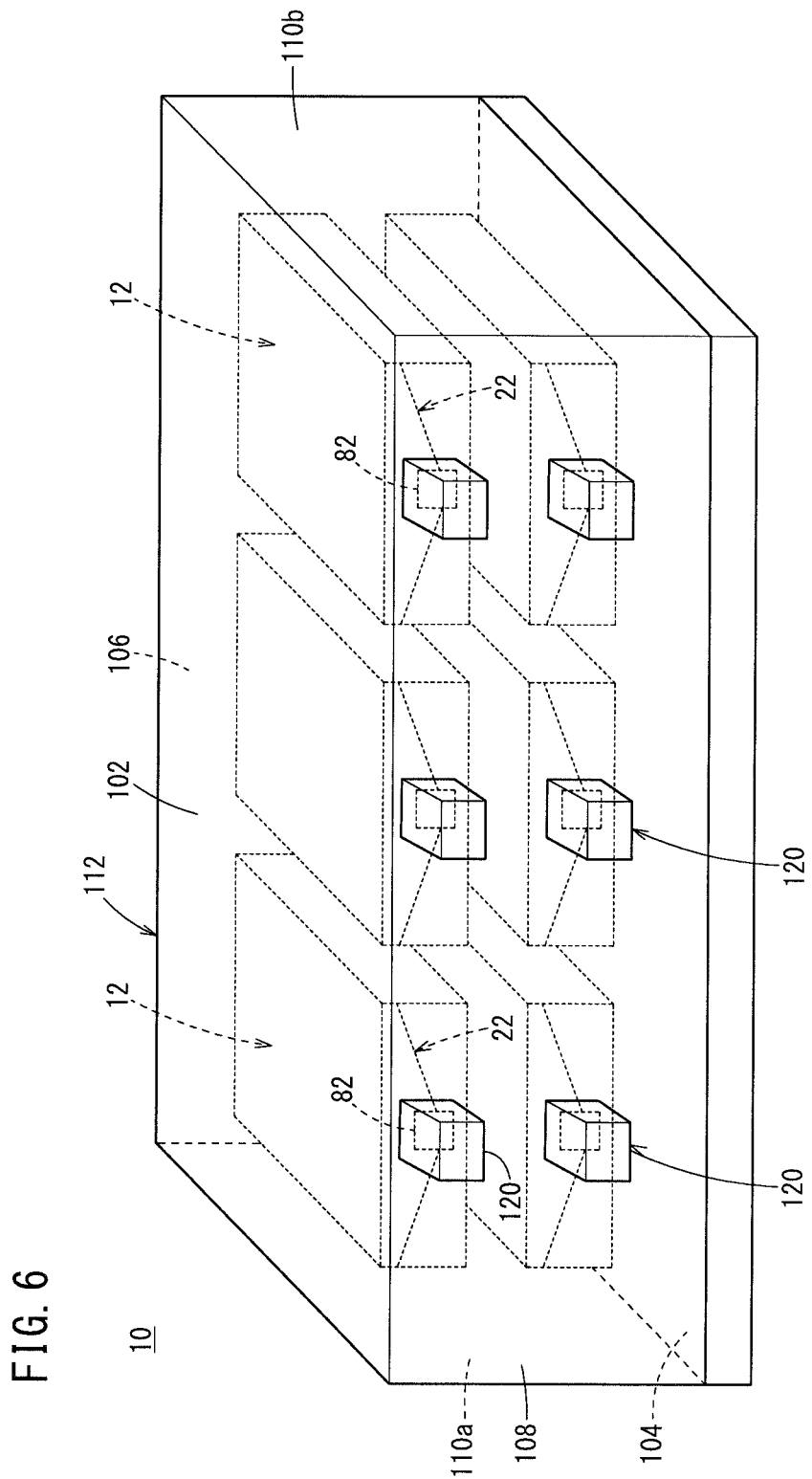
FIG. 6 is a transparent perspective view illustrating, in a partially omitted manner, the storage battery container of the embodiment as viewed from the back.
Figure 7:
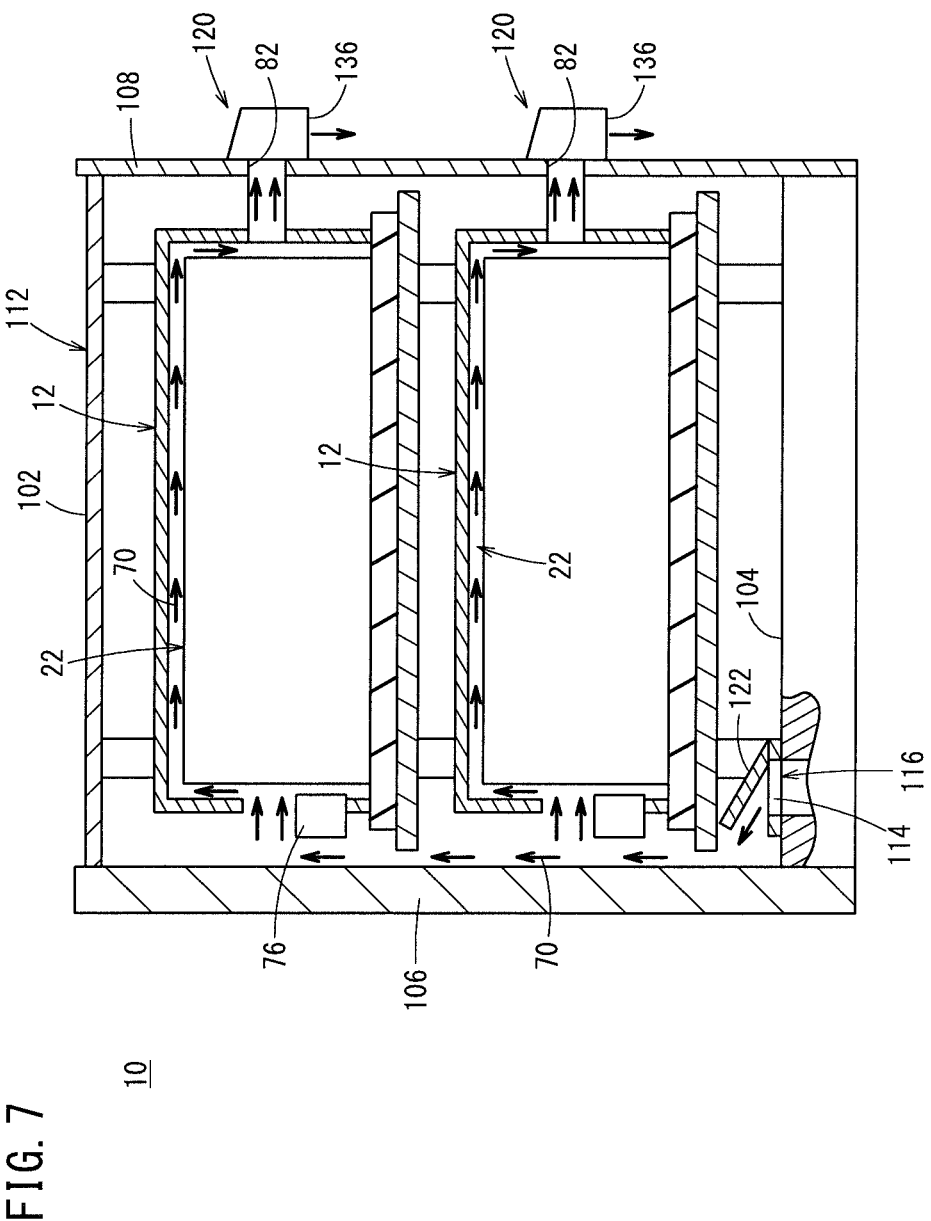
FIG. 7 is a cross section taken along line VII-VII in FIG. 5 in a partially omitted manner.

The container 10 includes a container body 112 having a top surface 102, a bottom surface 104, and four side surfaces (a front surface 106, a rear surface 108, a right side surface 110a, and a left side surface 110b), and the container 10 accommodates a plurality of storage batteries 12. FIG. 5 shows an example in which three storage batteries 12 are arranged side by side on the upper stage and three storage batteries 12 are arranged side by side on the lower stage, with two of the storage batteries 12 being disposed in each vertical row.

The container 10 includes: air supply portions 116 each having an air inlet port 114 formed in the bottom surface 104; the variable heat dissipation devices 22 described above; and air exhaust portions 120 provided at the rear surface 108 to respectively face the heat discharge portions 82 of the variable heat dissipation devices 22. Three air supply portions 116 are provided in correspondence with the number of the vertical rows, and six air exhaust portions 120 are provided in correspondence with the number of the storage batteries 12.

Figure 8:
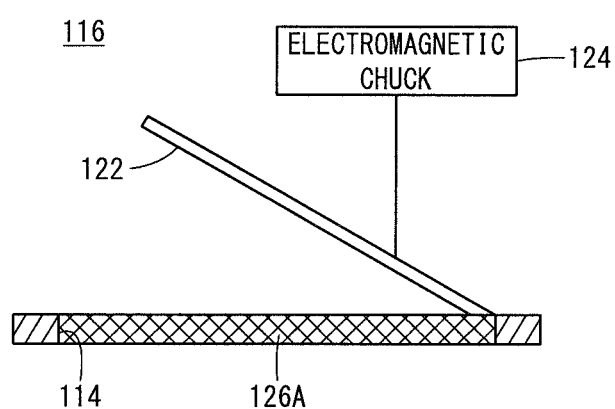
FIG. 8 is a configuration diagram illustrating an air supply portion.

Each air supply portion 116 places the air inlet port 114 in an opened state when electric power is being supplied, and places the air inlet port 114 in a closed state when the supply of electric power is stopped. For example, as shown in FIG. 8, each air supply potion 116 includes an opening/closing lid 122 and an electromagnetic chuck 124 that electromagnetically holds the opening/closing lid 122 when supplied with electric power, to thereby place the air inlet port 114 in the opened state. When the supply of electric power to the electromagnetic chuck 124 is stopped, the air inlet port 114 is closed due to the weight of the opening/closing lid 122 itself. It is preferred that the air inlet port 114 is provided with a first filter 126A for preventing entry of dust. In this case, it is preferred that the first filter 126A is a filter made of uninflammable nonwoven fabric, for example.

Figure 9:
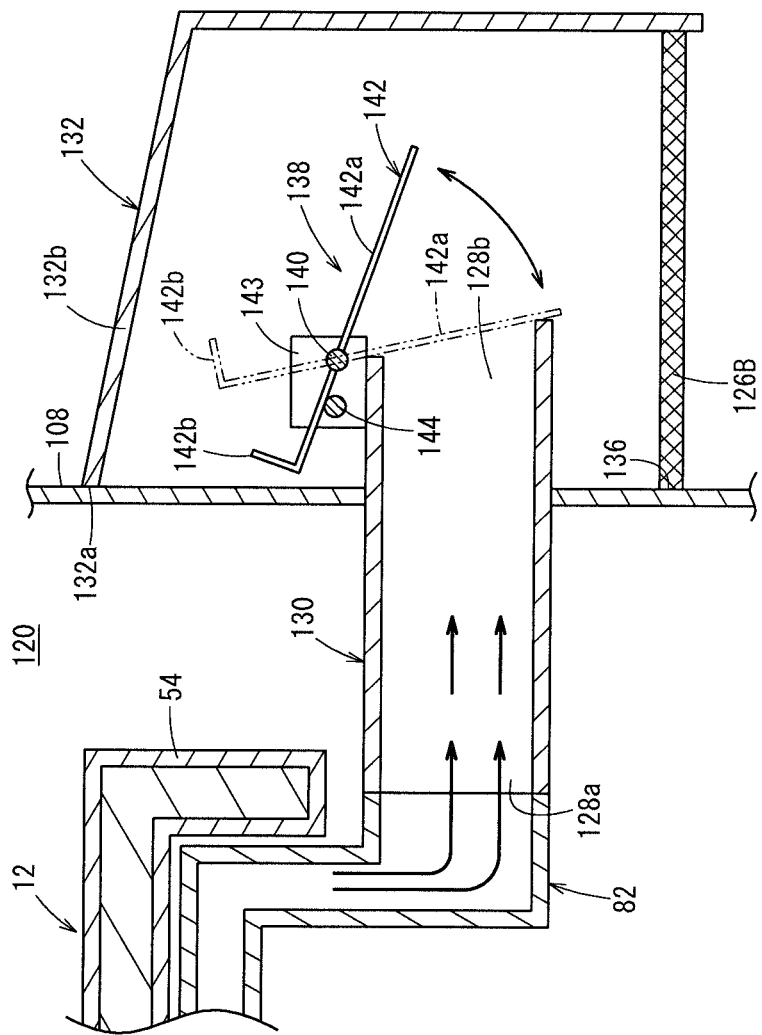
FIG. 9 is a longitudinal section illustrating a configuration of an air exhaust portion.

Each air exhaust portion 120 places the air exhaust port 136 (see FIG. 9) in substantially an opened state when the corresponding variable heat dissipation device 22 (see FIG. 1) is driven, and places the air exhaust port 136 in substantially a closed state when the variable heat dissipation device 22 is stopped. For example, as shown in FIG. 9, the air exhaust portion 120 includes a tube 130 that has one opening 128a and another opening 128b and that is arranged so that its center axis extends in substantially a horizontal direction, and a hood 132 for protecting the other opening 128b side of the tube 130.

The one opening 128a of the tube 130 is disposed in the interior of the container body 112 on the inside of the rear surface 108 of the container body 112, and the other opening 128b of the tube 130 is positioned on the outside of the rear surface 108 of the container 10.

The hood 132 has its opening end 132a fixed to the rear surface 108 among the side surfaces of the container body 112, and its top 132b inclined downward toward the rear. The hood 132 functions also as a protection from rainwater. The hood 132 has an opening formed at the bottom, and this opening constitutes the air exhaust port 136. The air exhaust port 136 discharges the air substantially downward. That is, the tube 130 is arranged so that its center axis extends in substantially the horizontal direction and the direction of exhaust from the air exhaust port 136 is substantially downward, so that the air is exhausted horizontally and then downward. It is preferred that the air exhaust port 136 is provided with a second filter 126B for preventing entry of dust. In this case, too, the second filer 126B is preferably a filter made of uninflammable nonwoven fabric, for example.

The tube 130 is further provided with a shutter 138 that opens and closes the other opening 128b. The shutter 138 includes a rotary shaft 140 and a rotary plate 142 that are provided within the hood 132 at the upper part of the tube 130 in a position closer to this other opening 128b. The rotary shaft 140 is rotatably supported by a pair of mounting plates 143 fixed on the tube 130.

The rotary plate 142 is formed by bending a piece of metal plate and has a substantially L-shaped cross section. That is, the rotary plate 142 has a structure in which a first plate portion 142a with a large area and a second plate portion 142b with a small area are integrally formed, and the first plate portion 142a and the second plate portion 142b form an angle from 85 to 95 degrees, for example.

The rotary plate 142 is rotatably attached to the rotary shaft 140, whereby, in a natural state (when the fan 76 is not being driven), the plate surface of the first plate portion 142a is positioned to close the other opening 128b of the tube 130, and the second plate portion 142b is positioned so as to protrude toward the top 132b of the hood 132.

Consequently, the rotary plate 142 is turned in one direction around the rotary shaft 140 by the wind pressure that is produced by the discharge of heat from the variable heat dissipation device 22 when the fan 76 is driven. That is, the entirety of the rotary plate 142 turns in such a direction that the first plate portion 142a separates away from the other opening 128b of the tube 130. Then, the heat from the variable heat dissipation device 22 is discharged through the tube 130, the hood 132, and the second filter 126B. That is, the air exhaust port 136 is placed in the opened state.

Further, the first plate portion 142a and the second plate portion 142b of the rotary plate 142 function also as a weight for adjusting the turning of the rotary plate 142 in that one direction. That is, the second plate portion 142*b* restricts the rotary plate 142 so that it does not turn in the one direction with a wind pressure that is smaller than the wind pressure produced by the heat discharge from the variable heat dissipation device 22. The mounting plates 143 may be provided with a stopper 144 so as to prevent the rotary plate 142 from turning excessively.

That is, in the natural state, the first plate portion 142*a* of the rotary plate 142 is almost hanging down and thereby substantially closes the air exhaust port 136. As the fan 76 is driven, the wind pressure produced by the heat discharge from the variable heat dissipation device 22 turns the rotary plate 142 in the one direction, allowing the heat from the variable heat dissipation device 22 to be discharged from the air exhaust port 136.

Next, functions of the container 10 of the embodiment will be described.

First, in a normal state, electric power is being supplied to the container 10, so that the electromagnetic chucks 124 operate in the respective air supply portions 116 to hold the opening/closing lids 122 in the opened state. That is, the air inlet ports 114 are normally opened.

In this normal state, if the variable heat dissipation device 22 of one storage battery 12 drives the fan 76, then, as the fan 76 starts, the air 70 introduced from the air inlet ports 114 is supplied into the duct 72 of this storage battery 12. As the air 70 is supplied into the duct 72, the heat in the box 42 is transferred to the air 70 in the heat transport portion 80 and raises the temperature of the air 70. The temperature-raised air 70 is discharged to the outside of the box 42 through the heat discharge portion 82. That is, the heat in the interior of the casing 18 is dissipated. This forcibly cools the interior of the casing 18, and the interior of the casing 18 is thus efficiently cooled even if the box 42 and the lid 44 both have a highly heat-insulated structure. As a result, the temperature in the casing 18 can be maintained within an allowable range even if the discharge output is high or lasts for a long time, which enables the battery assembly 16 inside the box 42 to operate in an optimum operating environment.

Then, the air 70 discharged from the heat discharge portion 82 (temperature-raised air) is sent toward the rear surface 108 side of the container body 112 by the wind pressure from the fan 76. In particular, in this embodiment, since the air exhaust portion 120 is disposed opposite to the heat discharge portion 82, the wind pressure of the air 70 discharged from the heat discharge portion 82 causes the rotary plate 142 of the air exhaust portion 120 to turn in the one direction. As a result, the discharged air 70 is introduced into the tube 130 through the one opening 128*a* of the tube 130, further passes through the tube 130, and is exhausted from the other opening (air exhaust port 136).

In the air exhaust portion 120 that corresponds to the storage battery 12 whose variable heat dissipation device 22 is not operating, the air 70 is not discharged from the heat discharge portion 82 and therefore the rotary plate 142 of the air exhaust portion 120 is maintained in the natural state. Then, the air entering from the opened air inlet ports 114 presses the rotary plate 142, but this is not forced introduction of air by the fan 76, and so the wind pressure against the first plate portion 142*a* of the rotary plate 142 of the air exhaust portion 120 is small. Accordingly, the weight of the second plate portion 142*b* prevents the rotary plate 142 from turning. That is, the first plate portion 142*a* is kept in the hanging down state. The air exhaust port 136 is thus kept in substantially the closed state. In this case, it is possible to maintain the closed state of the air exhaust port 136 without using electric power.

In this way, waste heat in each storage battery 12 can be exhausted directly through the air exhaust port 136 of the air exhaust portion 120 using the air 70 that is introduced from the air inlet ports 114 formed in the bottom surface 104 of the container body 112, and therefore the waste heat is not exhausted into the interior of the container body 112 from the storage batteries 12. That is, the amount of heat discharged into the interior of the container body 112 is unchanged irrespective of whether the variable heat dissipation devices 22 are being driven or stopped. As a result, in normal operation, a control to adjust the heat balance of the storage batteries 12 by the variable heat dissipation devices 22 can be made easy. Furthermore, the installation of the first filters 126A in the air inlet ports 114 makes it possible to avoid entry of dust, sand, etc. into the container body 112.

Next, if the supply of electric power to the container 10 is stopped due to maintenance work or emergency stop, the operation of the electromagnetic chucks 124 to hold the opening/closing lids 122 stops in the air supply portions 116. Accordingly, the opening/closing lids 122 close the corresponding air inlet ports 114 due to their own weights and keep them normally closed.

In each air exhaust portion 120, since the supply of electric power to the variable heat dissipation device 22 stops, the rotary plate 142 keeps the substantially hanging down state as explained above, thereby substantially keeping the air exhaust port 136 normally closed.

As a result, it is possible to confine the gas that contains active materials, for example, within the container 10 without supplying electric power from a battery, for example. This reduces the electric power that is required for the next operation and improves the operating efficiency. Furthermore, for example, there is no need to provide units for electrically opening and closing the air inlet ports 114 and the air exhaust ports 136, leading to simplification of the structure and reduced power consumption.

Further, because the flow passage of the exhaust is directed from a horizontal direction to a downward direction, it is possible to prevent dust, sand, etc. from directly entering the tube 130. Moreover, the installation of the second filters 126B in the air exhaust ports 136 further avoids entry of dust, sand, etc.

The embodiments described above can be summarized as follows.

[1] A storage battery container (10) has at least a top surface (102), a bottom surface (104), and a side surface (106, 108, 110*a*, 110*b*) and accommodates a plurality of storage batteries (12). The storage battery container (10) includes: air supply portions (116) each including an air inlet port (114) provided in the bottom surface (104); variable heat dissipation devices (22) provided respectively for the storage batteries (12), each of the variable heat dissipation devices (22) being configured to, when being driven, introduce air from the air supply portions (116) into the storage battery (12) and discharge heat in the storage battery (12) together with the air so as to achieve heat balance of heat accumulation in the storage battery (12); and air exhaust portions (120) provided on the side surface respectively in correspondence with heat discharge portions (82) of the variable heat dissipation devices (22) and each including an air exhaust port (136). Each of the air supply portions (116) places the air inlet port (114) in an opened state when supplied with electric power, and places the air inlet port (114) in a closed state when the supply of electric power is stopped, and each of the air exhaust portions (120) places the air exhaust port (136) in an opened state when the corresponding variable heat dissipation device (22) is driven, and places the air exhaust port (136) in a closed state when the variable heat dissipation device (22) is stopped.

First, in a normal state, the container (10) is supplied with electric power and therefore the air inlet ports (114) of the air supply portions (116) are opened. In this normal state, when the variable heat dissipation device (22) of one storage battery (12) is driven, then the air exhaust port (136) of the air exhaust portion (120) that faces the variable heat dissipation device (22) of this storage battery (12) is opened. That is, the heat in this storage battery (12) is dissipated.

In this way, waste heat in each storage battery (12) can be exhausted directly through the air exhaust port (136) of the air exhaust portion (120) using the air that is introduced from the air inlet ports (114), and therefore the waste heat is not discharged into the interior of the container (10) from the storage batteries (12). That is, the amount of heat discharged into the interior of the container (10) is unchanged irrespective of whether the variable heat dissipation devices (22) are being driven or stopped. As a result, in normal operation, a control to adjust the heat balance of the storage batteries (12) by the variable heat dissipation devices (22) can be made easy.

On the other hand, when the supply of electric power to the container (10) is stopped, the air inlet ports (114) of the air supply portions (116) are closed. Further, since the variable heat dissipation devices (22) are stopped, the air exhaust ports (136) of the air exhaust portions (120) provided to face the variable heat dissipation devices (22) are also closed. That is, it is possible to confine the gas that contains active materials, for example, within the container (10) without supplying electric power from a battery, for example. This reduces the electric power that is required for the next operation and improves the operating efficiency. Furthermore, for example, there is no need to provide units for electrically opening and closing the air exhaust ports (136), leading to simplification of the structure and reduced power consumption.

[2] In the embodiment, the air supply portions (116) may each include an opening/closing lid (122) that closes the air inlet port (114) by its own weight when the supply of electric power is stopped.

[3] In the embodiment, the air supply portions (116) may each hold the opening/closing lid (122) when supplied with electric power, to thereby place the air inlet port (114) in the opened state. In this case, the opening/closing lid (122) may be held electromagnetically. The opening/closing lid (122) is held to place the air inlet port (114) in the opened state when the container (10) is supplied with electric power. Air outside of the container (10) can thus be introduced into the interior of the container (10) through the air inlet ports (114).

[4] In the embodiment, the air inlet ports (114) may each be provided with a filter (126A) for preventing entry of dust. It is then possible to avoid entry of dust, sand, etc. into the container (10) through the air inlet ports (114).

[5] In the embodiment, the air exhaust portions (120) each include a tube (130) having one opening (128a) disposed corresponding to the heat discharge portion (82) of the corresponding variable heat dissipation device (22) and the other opening (128b) disposed outside of the side surface, and the direction of exhaust through the tube (130) is horizontal and the direction of exhaust through the air exhaust port (136) is downward.

When the variable heat dissipation device (22) is driven, air is supplied into the storage battery (12) and the heat in the storage battery (12) is transferred to the air and raises the temperature of the air. The temperature-raised air is discharged out of the storage battery (12) through the heat discharge portion (82). That is, the heat in the storage battery (12) is dissipated. The air discharged from the heat discharge portion (82) enters the air exhaust portion (120) through one opening (128a) facing the heat discharge portion (82) and is discharged through the air exhaust port (136) provided on the outside of the side surface of the container (10).

Further, since the exhaust through the air exhaust port (136) is directed downward, it is possible to prevent entry of dust, sand, etc. into the container (10) directly through the tube (130).

[6] In the embodiment, the air exhaust portions (120) may each include a rotary shaft (140) and a rotary plate (142) that are attached to the tube (130) in a position closer to the other opening (128b), and the rotary plate (142) may be turned in one direction around the rotary shaft (140) by a wind pressure that is produced as the corresponding variable heat dissipation device (22) discharges the heat when the variable heat dissipation device (22) is driven, to thereby place the air exhaust port (136) in the opened state.

The air discharged from the heat discharge portion (82) (air with a raised temperature) is sent toward the side surface of the container (10) by the variable heat dissipation device (22) being driven. In particular, since the air exhaust portion (120) is provided in correspondence with the heat discharge portion (82), the rotary plate (142) of the air exhaust portion (120) is turned in one direction by the wind pressure of the air discharged from the heat discharge portion (82). As a result, the discharged air is introduced into the tube (130) and further passes through the flow passage in the tube (130) and is discharged from the air exhaust port (136).

On the other hand, in the air exhaust portion (120) corresponding to the storage battery (12) whose variable heat dissipation device (22) is not being driven, air is not discharged from the heat discharge portion (82) and therefore the rotary plate (142) of the air exhaust portion (120) maintains its natural state and the air exhaust port (136) maintains the closed state.

[7] In the embodiment, preferably, the air exhaust portions (120) each include a weight provided for the rotary plate (142) to adjust at least the turning of the rotary plate (142) in the one direction.

In the air exhaust portion (120) corresponding to the storage battery (12) whose variable heat dissipation device (22) is not being driven, air is not discharged from the heat discharge portion (82) and therefore the rotary plate (142) of the air exhaust portion (120) maintains the natural state. Then, air entering from the opened air exhaust port (136) presses the rotary plate (142), but this is not forced introduction of air by the variable heat dissipation device (22), and so the wind pressure against the rotary plate (142) of the air exhaust portion (120) is small. Accordingly, the weight prevents the rotary plate (142) from turning. That is, the air exhaust port (136) is closed by the rotary plate (142). It is therefore possible to maintain the closed state of the air exhaust port (136) without using electric power. In this case, the rotary plate (142) itself may constitute the weight, or a separate weight may be attached to the rotary plate (142).

[8] In the embodiment, the air exhaust ports (136) may each be provided with a filter (126B) for preventing entry of dust. It is thus possible to further effectively avoid entry of dust, sand, etc.

[9] In the embodiment, at least a portion of the tube (130) where the rotary shaft (140) and the rotary plate (142) are provided may be covered by a hood (132), and the air exhaust port (136) may be provided in a lower part of the hood (132). When electric power is not supplied to the container (10), for example, dust, sand, etc. may enter the tube (130) together with air from the outside of the container (10). However, the hood (132) protects the rotary plate (142) of the air exhaust portion (120), thereby preventing dust, sand, raindrops, etc. from directly entering the container (10).

In the examples described above, three air supply portions 116 are provided in correspondence with the number of the vertical rows of the storage batteries 12, but one air supply portion or four or more air supply portions may be provided independently of the number of the vertical rows.

The storage battery container of the present invention is not limited to the embodiments described above but can of course adopt various configurations without departing from the essence and gist of the invention. For instance, in the examples above, both the box 42 and the lid 44 have a vacuum heat insulation structure, but the box 42 and the lid 44 may both be an air heat insulation structure. Needless to say, the lid 44 may be an air heat insulation structure and the box 42 may be a vacuum heat insulation structure, or the lid 44 may be a vacuum heat insulation structure and the box 42 may be an air heat insulation structure.

The invention claimed is:

1. A storage battery container including at least a top surface, a bottom surface, and a side surface, and accommodating a plurality of storage batteries, the storage battery container comprising:
    an air supply portion including an air inlet port provided in the bottom surface;
    a variable heat dissipation device comprising a metal duct through which air flows provided for each of the storage batteries and configured to, when being driven, introduce air from the air supply portion into the storage battery and discharge heat in the storage battery together with the air so as to achieve heat balance of heat accumulation in the storage battery; and
    an air exhaust portion provided on the side surface in correspondence with a heat discharge portion of the variable heat dissipation device and including an air exhaust port,
    wherein the air supply portion places the air inlet port in an opened state when supplied with electric power, and places the air inlet port in a closed state when the supply of electric power is stopped,
    the air exhaust portion places the air exhaust port in an opened state when the variable heat dissipation device is driven, and places the air exhaust port in a closed state when the variable heat dissipation device is stopped,
    the air exhaust portion includes a tube having one opening disposed corresponding to the heat discharge portion of the variable heat dissipation device and another opening disposed outside of the side surface, and a direction of exhaust through the tube is horizontal and a direction of exhaust through the air exhaust port is downward,
    the air exhaust portion includes a rotary shaft and a rotary plate that are attached to the tube in a position closer to the another opening,
    the rotary shaft is rotatably supported by a pair of mounting plates fixed on the tube, and the mounting plates are provided with a stopper so as to prevent the rotary plate from turning excessively, and
    the rotary plate is turned in one direction around the rotary shaft by a wind pressure that is produced as the variable heat dissipation device discharges the heat when the variable heat dissipation device is driven, to thereby place the air exhaust port into the opened state.

2. The storage battery container according to claim 1, wherein the air supply portion includes an opening/closing lid configured to close the air inlet port by an own weight thereof when the supply of electric power is stopped.

3. The storage battery container according to claim 2, wherein the air supply portion holds the opening/closing lid when supplied with electric power, to thereby place the air inlet port in the opened state.

4. The storage battery container according to claim 1, wherein the air inlet port is provided with a filter configured to prevent entry of dust.

5. The storage battery container according to claim 1, wherein the air exhaust portion includes a weight provided for the rotary plate to adjust at least the turning of the rotary plate in the one direction.

6. The storage battery container according to claim 1, wherein the air exhaust port is provided with a filter configured to prevent entry of dust.

7. The storage battery container according to claim 1, wherein
    at least a portion of the tube where the rotary shaft and the rotary plate are provided is covered by a hood, and
    the air exhaust port is provided in a lower part of the hood.

* * * * *